(No Model.) 8 Sheets—Sheet 1.

W. J. WRIGHT.
STAVE TRIMMING AND JOINTING MACHINE.

No. 475,227. Patented May 17, 1892.

WITNESSES
Fred G. Dieterich
Jos. A. Ryan

INVENTOR:
Wm J. Wright
BY Munn & Co
ATTORNEYS (No Model.) 8 Sheets—Sheet 2.

W. J. WRIGHT.
STAVE TRIMMING AND JOINTING MACHINE.

No. 475,227. Patented May 17, 1892.

WITNESSES
Fred G. Dieterich
Jos. A. Ryan

INVENTOR:
Wm J. Wright
BY
ATTORNEYS (No Model.) 8 Sheets—Sheet 3.

W. J. WRIGHT.
STAVE TRIMMING AND JOINTING MACHINE.

No. 475,227. Patented May 17, 1892.

Fig. 3.

WITNESSES:
Fred G. Dieterich
Jos. A. Ryan

INVENTOR:
Wm J. Wright
BY Munn & Co.
ATTORNEYS (No Model.) 8 Sheets—Sheet 4.
W. J. WRIGHT.
STAVE TRIMMING AND JOINTING MACHINE.
No. 475,227. Patented May 17, 1892.
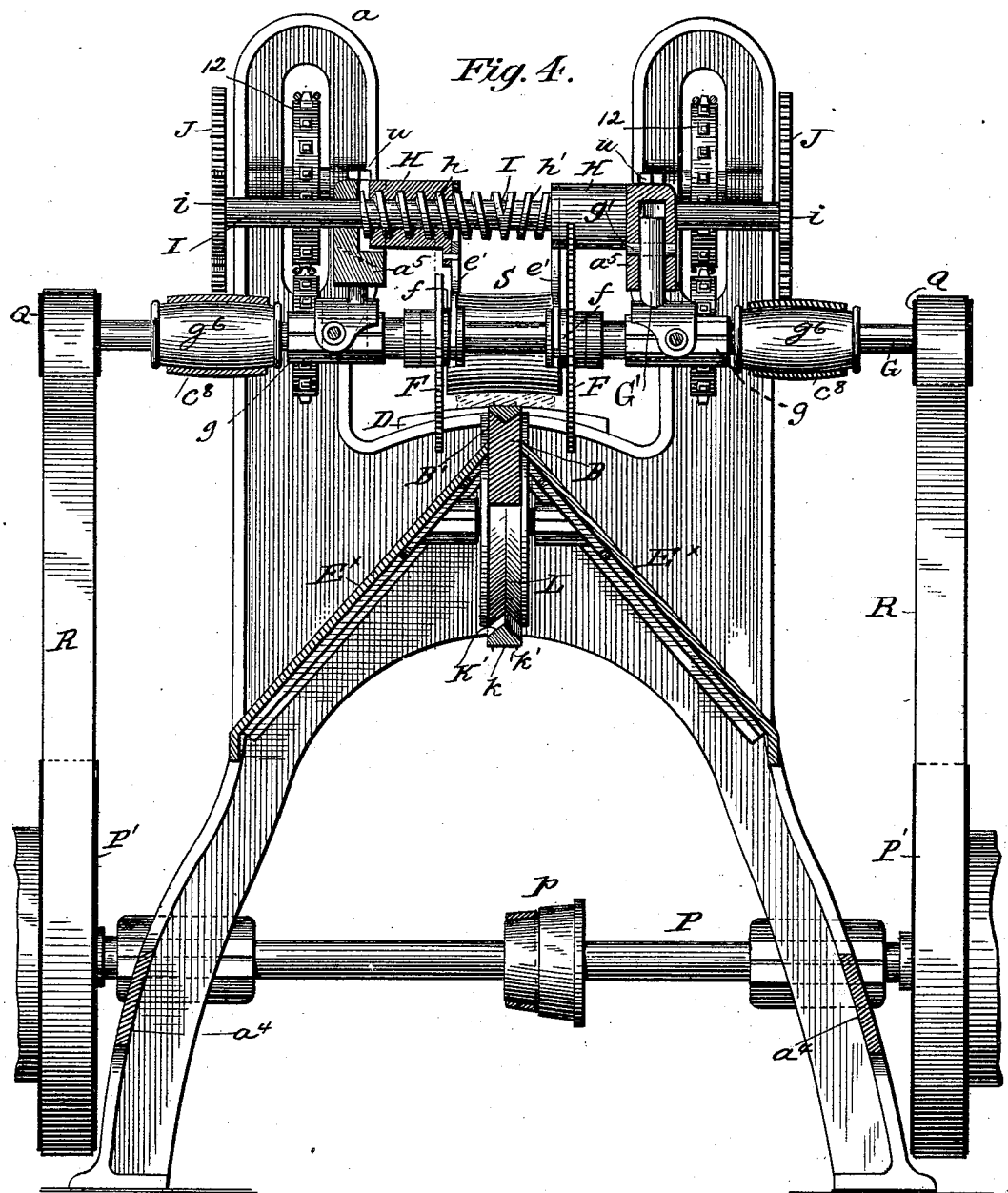
WITNESSES:
INVENTOR:
ATTORNEYS

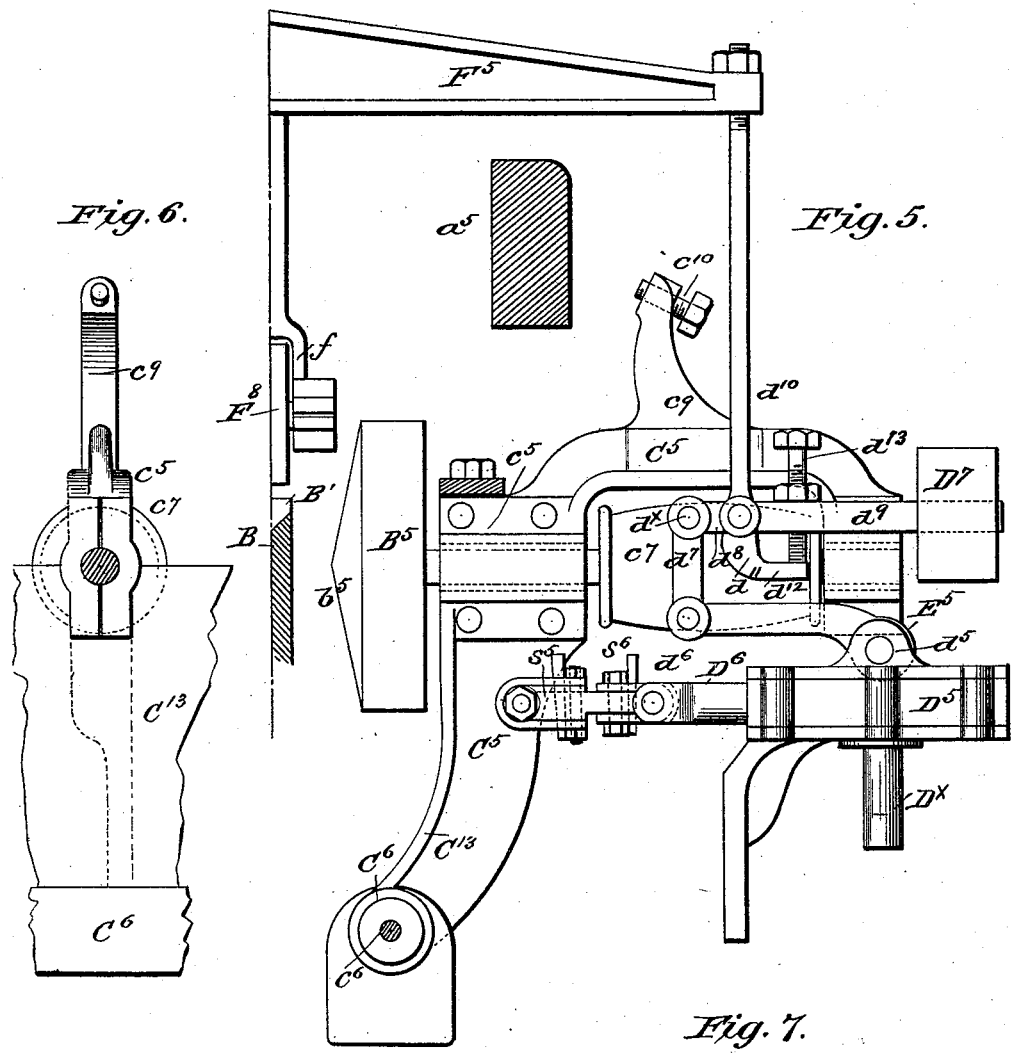

(No Model.) 8 Sheets—Sheet 6.

W. J. WRIGHT.
STAVE TRIMMING AND JOINTING MACHINE.

No. 475,227. Patented May 17, 1892.

WITNESSES:
Fred G. Dieterich
Jos. A. Ryan

INVENTOR:
Wm. J. Wright
BY Munn & Co
ATTORNEYS

THE NORRIS PETERS CO., PHOTO-LITHO., WASHINGTON, D. C.

(No Model.) 8 Sheets—Sheet 7.
W. J. WRIGHT.
STAVE TRIMMING AND JOINTING MACHINE.
No. 475,227. Patented May 17, 1892.
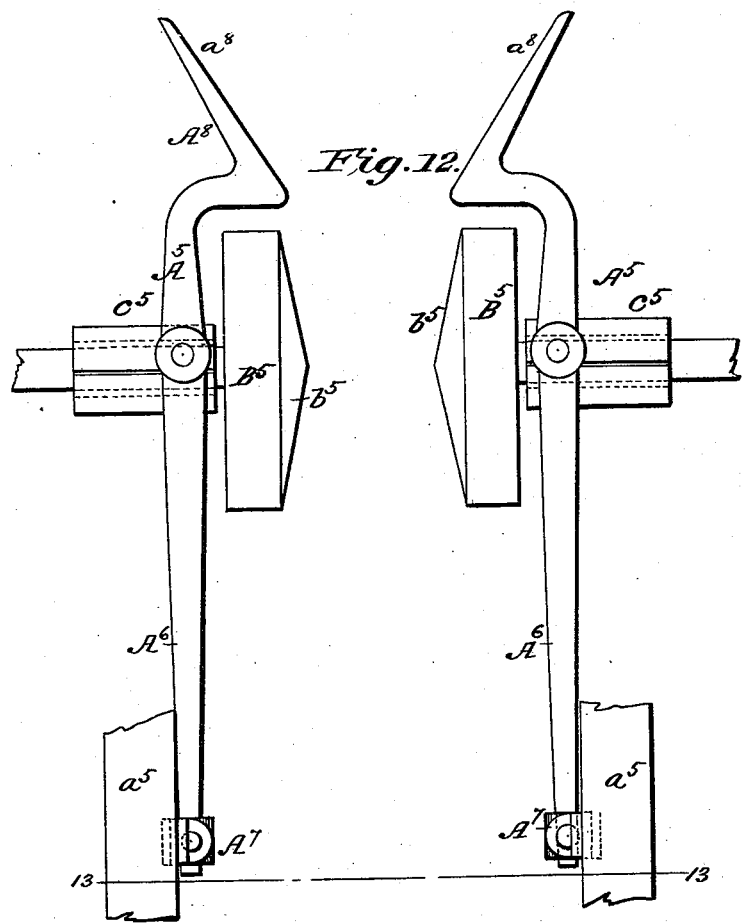
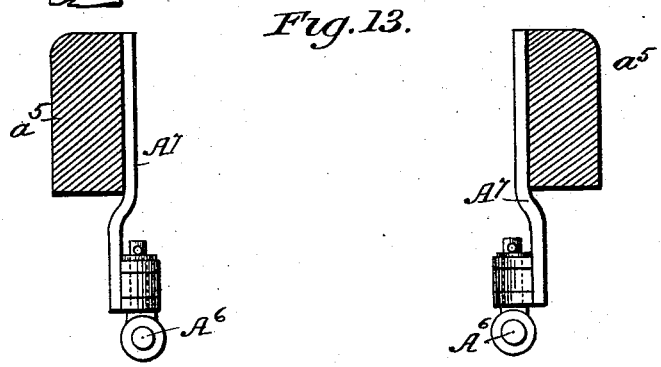
WITNESSES:
Fred G. Dieterich
Jos. A. Ryan
INVENTOR:
Wm. J. Wright
BY
ATTORNEYS (No Model.) 8 Sheets—Sheet 8.
W. J. WRIGHT.
STAVE TRIMMING AND JOINTING MACHINE.
No. 475,227. Patented May 17, 1892.
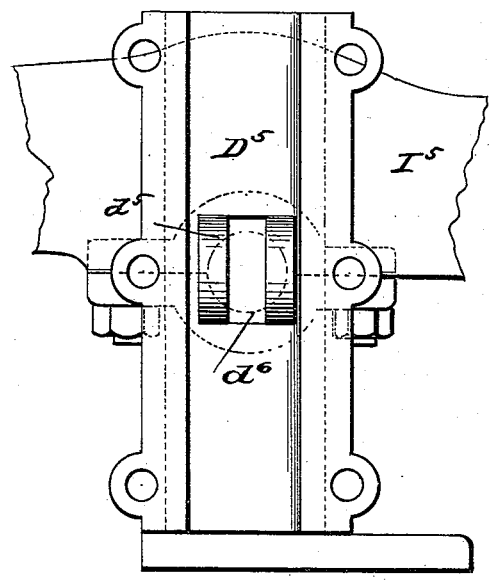
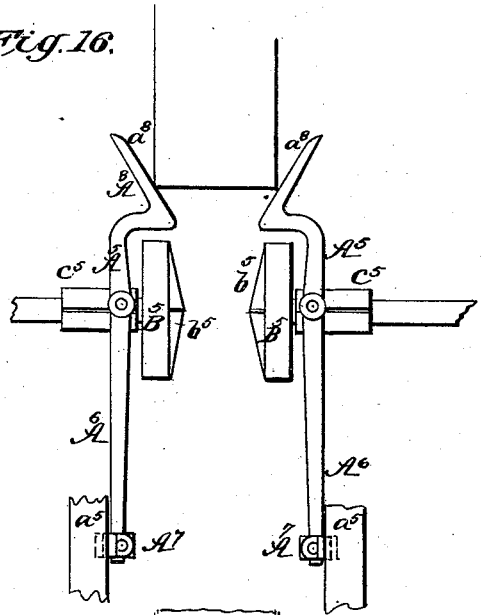
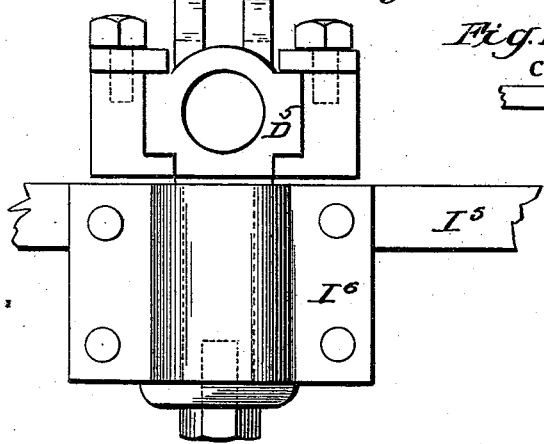
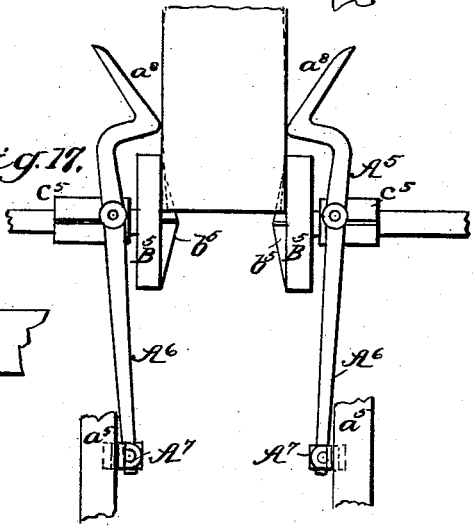
WITNESSES:
Fred G. Dieterich
Jos. A. Ryan
INVENTOR:
Wm. J. Wright
BY Munn & Co.
ATTORNEYS

UNITED STATES PATENT OFFICE.

WILLIAM J. WRIGHT, OF COOPERSTOWN, ASSIGNOR TO THE STAVE JOINTER AND PLANER COMPANY, OF OIL CITY, PENNSYLVANIA.

STAVE TRIMMING AND JOINTING MACHINE.

SPECIFICATION forming part of Letters Patent No. 475,227, dated May 17, 1892.

Application filed April 11, 1891. Serial No. 388,466. (No model.)

*To all whom it may concern:*

Be it known that I, WILLIAM JAMES WRIGHT, residing at Cooperstown, Venango county, and State of Pennsylvania, have invented a new and Improved Stave Trimming and Jointing Machine, of which the following is a specification.

My invention has for its object to provide a stave-machine wherein and by which the billet is first trimmed to the proper size, after which it is automatically fed into the machine through the various stages necessary to complete it, the said stave as it passes through the machine serving to automatically control and set the bevel-cutting and bilge-forming devices in exact proportions relative to the different widths thereof.

My present invention relates more particularly to improvements on the machine patented by me October 7, 1890, No. 438,045; and it consists in the peculiar combination and novel arrangement of the several parts, all of which will hereinafter be fully described in the annexed specification, and particularly pointed out in the claims, reference being had to the accompanying drawings, in which—

Figure 1:
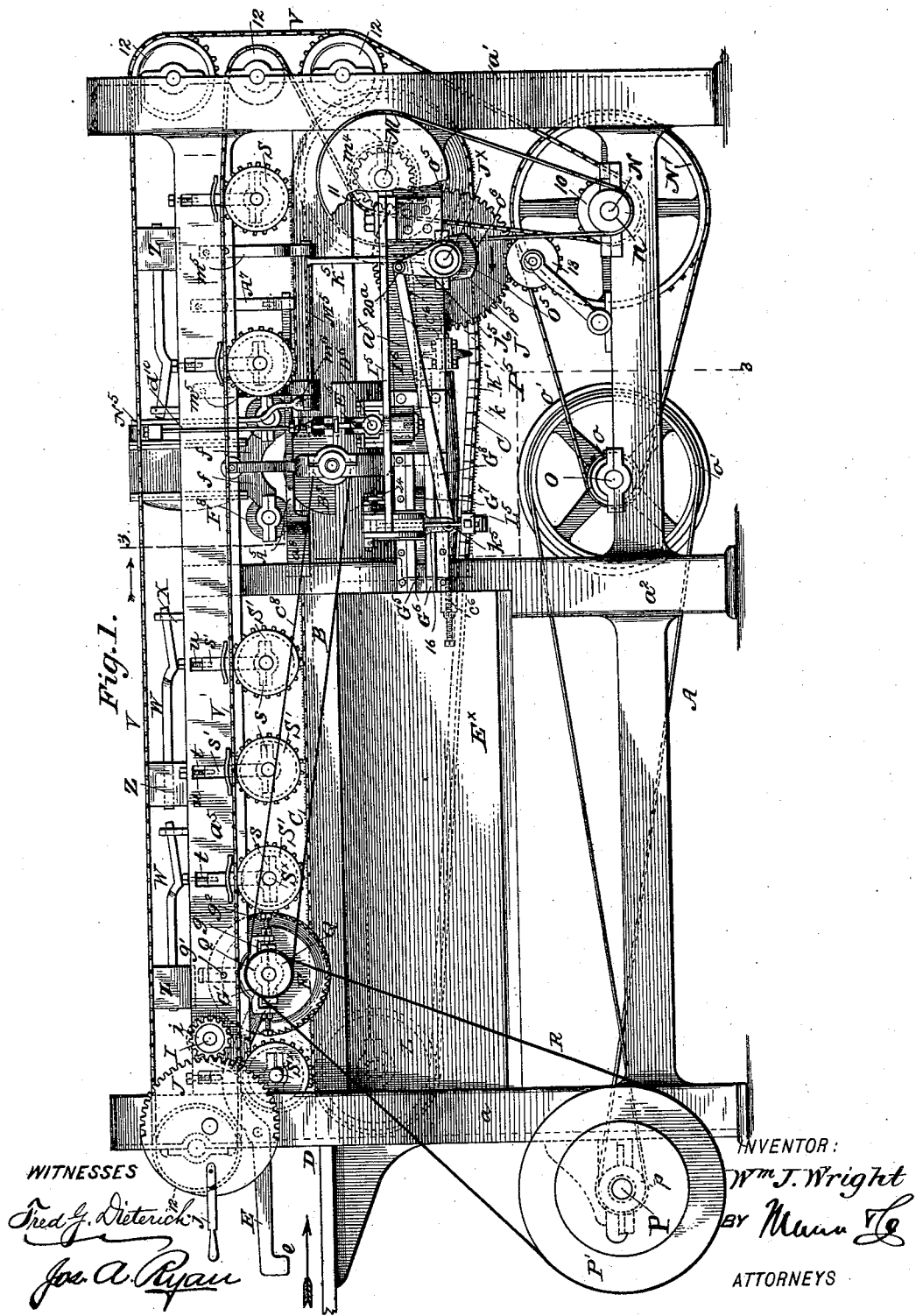
Figure 2:
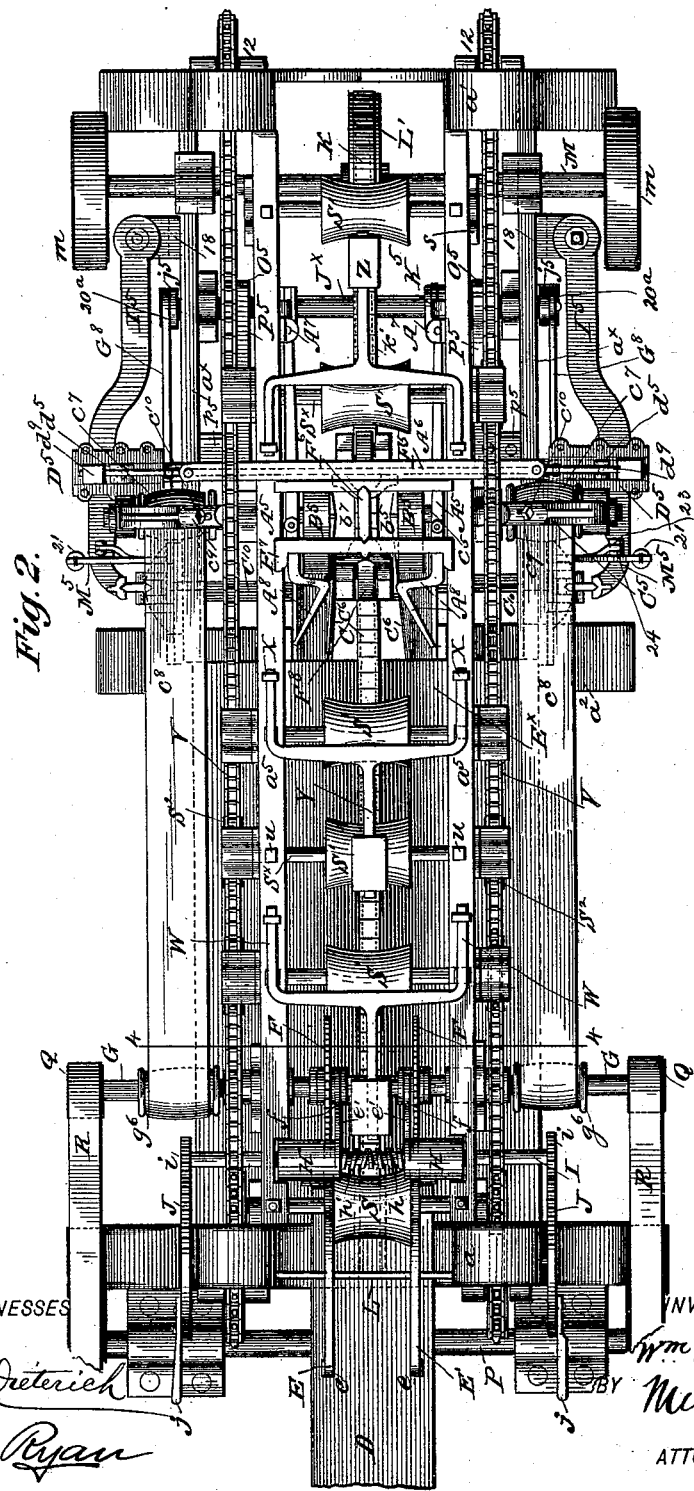
Figure 18:
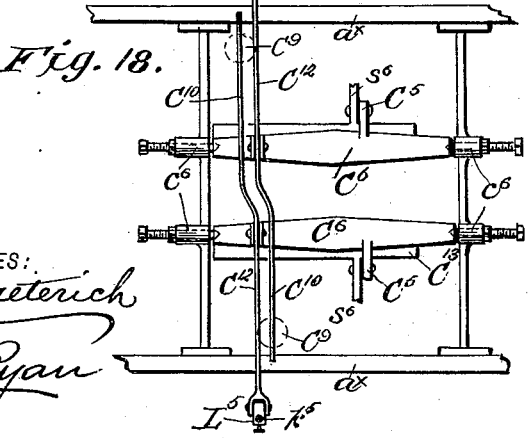

Figure 1 is a side elevation of my improved machine. Fig. 2 is a top plan view thereof. Fig. 3 is a transverse vertical sectional elevation taken on the line 3 3, Fig. 1, looking in the direction indicated by the arrow. Fig. 4 is a similar view taken on the line 4 4, Fig. 2, one of the gage-screw bearings being also shown in section. Figs. 5, 6, and 7 are detail views illustrating one of the bevel-cutters and its attachment with its head-block. Figs. 8, 9, 10, and 11 are detail views illustrating the bilge-forming devices hereinafter particularly referred to. Fig. 12 is a plan view of the pivoted spreaders hereinafter referred to. Fig. 13 is a cross-section of the same on the line 13 13, Fig. 12. Figs. 14 and 15 are detail views of the head-block. Figs. 16 and 17 are detail views hereinafter referred to, and Fig. 18 is a detail inverted plan view illustrating the manner of supporting the rocking frames $C^5$ on the main frame.

For the sake of clearness and briefness I shall describe the construction and operation of my machine by beginning at the point where the billet first enters, following its course through the machine, and describing in detail as near as possible the various parts of the machine, which are successively automatically set in position and operated by the moving billet.

In the accompanying drawings, A indicates the main frame, formed with end legs or supports $a$ $a'$, of a shape shown most clearly in Fig. 3 and 4, and with a central leg $a^2$, and B indicates a central longitudinal bed-rail, which extends from the front leg $a$ to the rear leg $a'$, such rail also forming the guide for the endless-chain carrier C, presently referred to.

The front end of the machine is formed with an extension D, which I shall term the "billet-bed," as it forms a rest for the billet before it is pushed into the machine.

E E indicate gage-arms, which project outward from the front end of the machine, their outer ends being formed with fingers or pointers $e$ $e$, which are arranged to project over the central portion of the stave when it is laid on the bed D, the said gage-arms being arranged for transverse adjustment to or from each other, such adjustment operating to set the trimmer-saws F F.

By referring to Figs. 2 and 4, the construction and arrangement of the trimmer-saws and the gage devices will be most clearly understood, said saws F being journaled upon a transverse shaft G to turn therewith and adjustable transversely thereon, said saws having clutch members $f$, with which the inner ends $e'$ $e'$ of the gage-arms E are connected, as shown, such arms being also connected with transversely-movable boxes H, mounted upon a shaft I, journaled in the longitudinal side bars $a^5$ of the frame, as shown, such shaft being provided with right and left screw-threads $h$ $h'$, which work in right and left screw-threads in the boxes H, whereby when such shaft is turned in one direction it will serve to bring the boxes and gage-arms and trimmer-saws toward each other and when turned in an opposite direction to adjust such parts outward from each other.

By reference to Fig. 2 it will be seen that the gage-arms E are arranged in line with the saws F, so that when the operator places a billet on the bed D he adjusts the gage-arms E to the width desired, (such width depending upon the character of the billet,) which sets the saws to their proper position, and to arrange for quickly adjusting such arms E, I provide the shaft I with cog-gears $i\ i$, which mesh with toothed disks J J, journaled on the sides of the leg $a$, as shown, such disks having outwardly-projecting handles $j\ j$, whereby the operator by lifting or depressing them will revolve the shaft I in reverse directions to set the saws.

The endless carrier C, before referred to, is formed of a series of triangular-shaped links K', the base $k$ of which is formed with projecting teeth $k'$, (see Fig. 4,) while the angular body K' fits and is guided in an angular longitudinal socket B' in the bed-piece B, such chain-carrier passing over a grooved wheel L, journaled in the front end of the machine, and over a similarly-constructed wheel L', journaled upon a transverse shaft M, provided with belt-pulleys $m\ m$, which receive motion from belt-pulleys $n\ n$ on a transverse shaft N, journaled in the side bars $a^4\ a^4$ of the main frame, said shaft being provided with a sprocket-wheel N', which is connected to sprocket-wheel $o$ on an intermediate shaft O, provided with cone-pulleys $o'\ o'$, which are belted with similar pulleys $p$ on the drive-shaft P, said shaft being also provided with band-pulleys P' P', over which and pulleys Q Q on the saw-shafts G pass drive-belts R R, as shown.

By means of the aforesaid construction it will be observed that when the stave is pushed into the machine its under face will be engaged by the toothed carrier C and drawn under the yielding pressure-roller S, and as it is carried along it will be trimmed by the saws F F, and the chips and shavings (following on the incline table E$^\times$, which extends from the leg $a$ to the central leg $a^2$) will be discharged at the sides of the machine. The stave after leaving the saws will be carried along by the carrier C under a series of yielding pressure-rolls S' S', the shafts of which are journaled in boxes $s\ s$, each formed with vertical extensions $s'\ s'$, fitting in sockets $t\ t$ in the side beams $a^5$ of the frame, said extensions being held in the sockets $t$ for vertical movement therein by means of adjusting-screws $u\ u$, which pass through threadless apertures in the upper face of the beams $a^5$, the heads of such screws serving to limit the downward movement of the extensions. The saw-shaft G is also held in boxes $g\ g$, held in yokes G', supported from the side beams $a^5$, such yokes having, however, a fixed relation with the beams, being held from vertical movement by means of the pins $g'$, said boxes $g\ g$ having adjustable pivotal bearings $g^2\ g^2$, as shown. The shafts S$^\times$ of the rollers S are provided on their ends with sprocket-wheels S$^2$, over which pass the endless sprocket-chains V, the weight of such chains serving to ordinarily press the said rollers down against the stave to hold it in contact with the carrier C; but to positively hold the stave in tight frictional contact with such carrier I provide for some of such rollers additional means for holding them down against the stave, such means being clearly illustrated in Figs. 1 and 2 of the drawings, by reference to which it will be seen that I provide yoke-arms W W, arranged to bear against the heads of the screws $u$, their outer ends being guided in slotted standards X X, as shown, the rear ends of such yokes being formed into a single member Y, upon which is secured a weight Z.

All yielding rollers S are operated to revolve in the proper direction by means of the endless chains V, such chains receiving motion from sprocket-wheels 10 on the shaft N and arranged to pass over a sprocket-wheel 11, loosely mounted on the shaft M, and a series of guide sprocket-wheels 12, as shown, gravity belt-tighteners 13 being employed to take up the slack of such chains, as clearly shown in Fig. 1 of the drawings. The trimmed stave as it is carried along engages a pair of arms A$^5$ A$^5$, which I term the "spreader-arms," as they serve to spread the cutter devices apart to their proper positions relatively to the width of the stave to be beveled and bilged. These arms, which are most clearly shown in Figs. 12 and 13 of the drawings, are each formed of a member A$^6$, which extends rearward beyond the cutting devices and has a pivotal bearing in a bracket A$^7$, projected downward from the side beams $a^5$. The outer ends of the said arms are projected to a point just in advance of the cutters B$^5$ and are bent inward toward each other to a point nearly in line with the cutting-blades $b^5$, and are then flared outward, as at A$^8$, and formed with flattened enlarged heads $a^8$, which are arranged to be normally in the path of the moving billet. The arms A$^5$ have a pivoted connection with the cutter-bearings $c^5$, as shown, and serve when the stave engages the heads $a^8$ to spread them to carry the cutters out to a position ready to cut the bilge. It will be observed by reference to said Figs. 12 and 13 that the relation of the heads $a^8$ and the cutters is such that as the arms A$^5$ spread the distance between the heads $a^8$ will be slightly greater than the distance between the cutters, as illustrated in Fig. 16. This provides for the cutters beginning to cut on the end of the stave a point inside of its outer edges, so as to get the proper bilge cut, as will be clearly understood from Fig. 17 of the drawings. At this point I desire to state that the stave immediately after engaging the spreaders, as stated, to set the cutters engages lifting devices, which serve to automatically lock the cutters to their adjusted positions, and at the same time set in motion certain gear devices which operate to move the head-blocks and the cutters inward and outward to form the proper bilge. The construction and arrangement of the cutters, the locking devices, and the head-blocks are most clearly shown in Figs. 3, 5, 6, and 7, by reference to which it will be seen that each of the cutters is mounted in bearings supported on a rocking frame $C^5$, supported at their lower ends upon rock-shafts $C^6$, mounted upon adjustable center bearings $c^6$, held in bosses formed on the main frame A.

The frames $C^5$ are formed of yoke shape to accommodate the drive-pulleys $c^7$, mounted on the cutter-shafts, which receive motion from belts $c^8$, which connect them with pulleys $g^6$ on the trimmer-saw shaft G, upward extensions $c^9$ being also formed on the yoke-frames $C^5$, in the upper ends of which are adjusting-screws $c^{10}$, which are arranged to limit the inward movement of the cutters by engaging the beams $a^5$ in a manner clearly understood by reference to Fig. 5, said cutter-supporting frame and cutters being normally drawn to their innermost positions by means of counter-weights $C^9$, held on the outer ends of horizontal arms $C^{10}$, projected inward from the shafts $C^6$, said arms $C^{10}$ being also formed with outward extensions $C^{12}$, for a purpose presently explained.

$C^{13}$ indicates lateral extensions formed on the frame $C^5$, which form a trough into which the chips and shavings from the cutters fall and which serves to discharge them centrally of the machine between the shafts $C^6$ $C^6$.

$D^5$ $D^5$ indicate the head-blocks, in which operate the plunger-rods $D^6$, the outer ends of which are connected with the frames $C^5$ by an approximately universal pivotal connection formed of the jointed sections $s^5$ $s^6$, as clearly shown in Figs. 5 and 7. The upper faces of such head-blocks are formed with projecting apertured ears $d^5$, between which the said faces are slotted, as at $d^6$, (see Fig. 14,) through which project eccentrics or cam-levers $E^5$, pivoted between the said ears $d^5$, said levers having inwardly-extending arms which are hinged to links $d^7$, joined to the inner ends $d^8$ of weighted levers $d^9$, supported from the vertical arms $d^{10}$, supported at their upper ends on the cross-head $F^5$, such arms $d^{10}$ being pivotally secured to the levers $d^9$ near their inner ends, said arms $d^{10}$ having downward extensions $d^{11}$, formed with horizontal arms $d^{12}$, arranged to bear against adjusting-screws $d^{13}$, which pass down through the weighted levers, as shown.

The cross-head $F^5$ is secured to the upper end of a vertically-movable frame $F^6$, held in guideways $F^7$ $F^7$, secured upon the side beams $a^5$ $a^5$, and in the lower end of such frame is journaled a pair of rollers $F^8$, arranged in the same longitudinal plane and held in bearings formed on the bifurcated arms $f$ of the frame $F^6$, said rollers being arranged over the endless-carrier-supporting rail B, as shown. By this construction it will be seen that after the stave has set the cutters it engages the rollers $F^8$ and raises the frame $F^6$ and cross-head $F^5$, which movement lifts the arms $d^{10}$, which movement serves to lift the rear end of the eccentric or cam-arm and cause the cam to lock against the plunger-rod and hold it to its adjusted position during the time which it takes the stave to pass from under the rollers $F^8$.

As it is necessary that the cam lock against the plunger-rod with the same pressure at all times irrespective of the thickness of the stave, I form the weight $D^7$ of such a size and arrange it on the lever in such a manner that a predetermined tension on the link $d^7$ will counterbalance it. By this construction when a stave of more than the average thickness passes under the roller $F^8$ the link $d^7$ will form a fixed fulcrum for the lever $d^9$, which lever will then be lifted with its weight, the set-screw $d^{13}$ then becoming disengaged from the extension $d^{12}$, the said screw serving to hold the weighted lever to its horizontal position by engaging the extension $d^{12}$, as shown, and thereby unlock the cam.

Having shown and described how the cutters are set and held to cut the proper bevel, I shall now describe the manner in which said cutters are automatically adjusted inward and outward to form the bilge.

Figure 8:
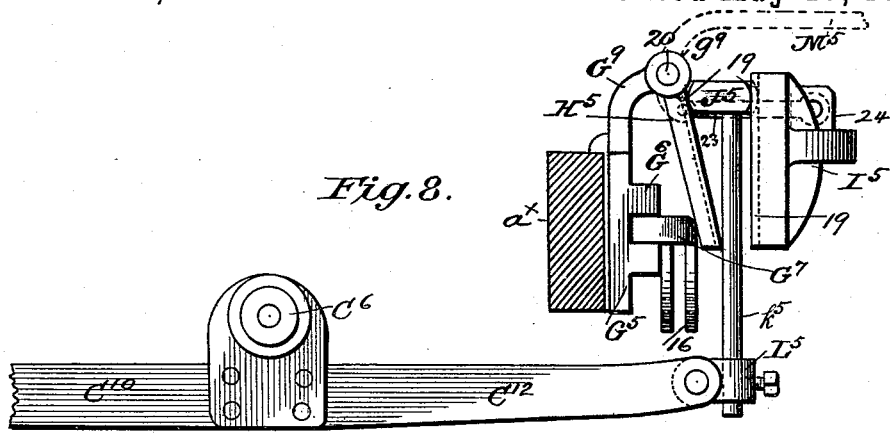
Figure 9:
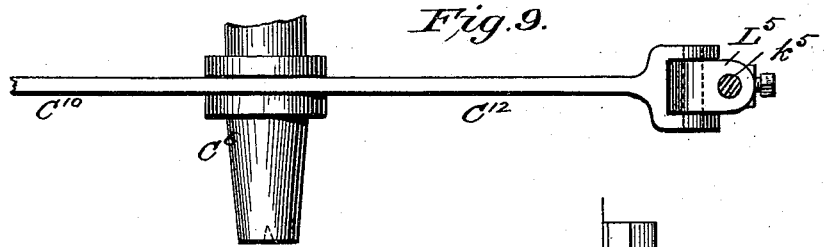
Figure 10:
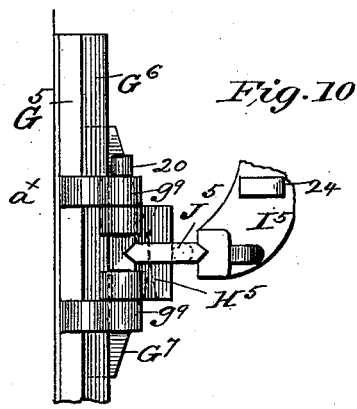
Figure 11:
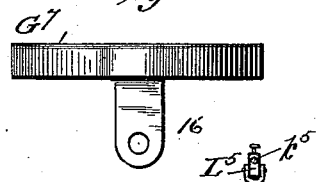

By reference to Figs. 3, 8, and 10 it will be observed that upon the longitudinal side bars $a^\times$ are secured guide-plates $G^5$, formed with horizontal flanges $G^6$, in which are seated the movable former-plates $G^7$, one of which is shown in face view in Fig. 11 of the drawings, each of such formers $G^7$ consisting of a plate having its front face curved to the bilge upon which it is desired to cut the staves, it being understood that such bilge-formers are made to be detachably connected, so as to admit of other formers being placed in positions with different bilge-faces, the curve of such formers depending upon the bilge desired to be cut on the staves. Each of the formers $G^7$ is provided with apertured lugs 16 16, in which are pivoted the ends 17 of pitmen $G^8$, which pitmen are connected to certain operating mechanism, presently explained.

$G^9$ indicates members extending upwardly from the plate $G^5$, the upper ends of which form hinge-lugs $g^9$ $g^9$, in which are hinged the outwardly-inclined swinging plates $H^5$, the lower ends of which bear against the outer face of the former-plates $G^7$.

$I^5$ indicates horizontally-disposed swinging levers, the rear ends of which have a pivotal bearing upon brackets 18 18 on the bars $a^\times$, while their forward ends are extended to a point in front of the plates $H^5$, the inner face of such ends, as well as the plates, being formed with registering guide-grooves 19 19, in which fit to slide transverse lugs $J^5$ $J^5$, fitted upon the upper ends of rods $k^5$, having an adjustable connection at their lower ends in swivel-bearings $L^5$, secured to the outer ends of the bars $C^{12}$ $C^{12}$, as shown. Each of the levers $I^5$ is provided (see Fig. 15) with a box $I^6$, in which fits a stem $D^\times$, projected down from the head-blocks $D^5$ and held thereto in the manner shown. To normally hold the front end of the levers $I^5$ against the lugs $J^5$, I provide the means most clearly shown in Fig. 8 of the drawings, by reference to which it will be seen that upon the pintles 20 20 are hinged crank-levers $M^5$, the long arm of which carries a weight 21 21, the short arm 22 being pivotally connected to an arm 23, the outer end of which is pivoted between lugs 24 24 on the levers $I^5$, as shown. The operation of such parts will be readily understood by reference to the drawings.

By means of the construction of the bilge-forming devices, as described, it will be observed that provision is made for always cutting the proper bilge upon narrow or wide staves with the use of a former-plate, as stated, the levers $I^5$ being first automatically set to bring the head-blocks to their proper position before the former-plate is operated to move the said levers. Thus should a stave of a narrow width engage the spreaders $A^5$ it would cause the cutter-frame $C^5$ and rock-shafts $C^6$ to rock, and thereby depress the arm to a certain degree, and thus pull the lugs $J^5$ down against the swinging plates $H^5$, and thereby force the ends of the levers $I^5$ outward, and thereby set the head-block to the proper position. Now should a wider stave enter after the narrow stave the shaft $C^6$ will be rocked to a greater degree, and the arm $C^{12}$ consequently brought down to a greater extent, thereby bringing the lug farther down against the swinging plate $H^5$, which, being disposed diagonally outward, as shown, causes the end of the lever $I^5$ to be swung farther outward, thus bringing the head-blocks farther outward. Thus I can at all times obtain proper bilge cut irrespective of the width of the stave and all gaged from the same bilge-former.

Thus having shown how the head-blocks are set, I shall now proceed to describe the means by which the former is operated, such means being most clearly shown in Fig. 1, by reference to which it will be seen that the pitman-arms $G^8$ extend rearwardly and are pivoted at $20^a$ to the crank-arms $j^5$, secured upon the outer ends of a transverse shaft $j^\times$, journaled in the side pieces $a^\times$ of the frame, as shown. The shaft $J^\times$ is arranged to receive intermittent motion through the movement of the stave, which operates to throw gear-wheels $J^6$ on said shaft into mesh with smaller gears $m^4$, mounted upon the carrier-shaft M, such operation being accomplished by means of swinging clutch-arms $K^5$, which at their lower ends embrace clutch-collars $L^\times$, arranged to be thrown into engagement with clutch members $J^7$ on the wheels $J^6$, such arms being connected to and operated by the rock-shafts $M^5$, journaled in brackets $m^5$ $m^5$, secured to the side beams $a^5$ of the frame, said shafts having crank-arms $m^6$, which are pivotally connected with the lower ends of rods $N^5$, (see Figs. 1 and 3,) the upper ends of which are connected to the cross-head $F^5$, as shown. By this construction it will be observed that when the stave passes under the cross-head $F^5$ to lift it the arms $N^5$ will rise with it and rock the shafts $M^5$, swing the arms $K^5$, and throw the clutches $L^\times$ (see Fig. 3) into engagement with the cluch members $J^7$, and thereby lock it to the shaft $J^5$, and thereby cause such shaft to turn with it. As the stave-billets are nearly all of a uniform length, the relation of the wheels $J^6$ and $m^4$ is such that each billet as it passes under the cross-head lifting devices will hold the wheel $J^6$ and its shaft locked until said wheel $J^6$ shall have made one-half of a revolution, at which time the clutches will automatically become disengaged and the wheel $J^6$ allowed to turn loose upon the shaft $J^\times$.

In operation the former $G^7$ is to make a complete movement in one direction in its guides at each half of a revolution of the gear $J^6$. Thus, supposing the former $G^7$ to be in its forward position and a stave is started under the cross-head lifting-frame the gear $J^6$ will revolve in the direction indicated by the arrow in Fig. 1, thereby causing the crank $J^5$ to draw the former $G^7$ forward until the wheel has made a semi-revolution, at which time the former-plate will have reached its rearmost position. Now as the next succeeding stave follows the shaft $J^\times$ will be again set in motion and finish its revolution, the crank and pitman serving to force the formers $G^7$ to their former position, such formers $G^7$ serving to properly operate the head-blocks on either the rearward or forward movements. As the shaft M is revolved at some speed, it will serve to cause the momentum imparted to the shaft $J^\times$ to move such shaft a little more than its half-revolution as the clutch members are automatically disengaged, and, further, as some of the stave-billets may vary slightly as to their length it is necessary that the said shaft $J^\times$ should always stop when the former-plate $G^7$ has been drawn out to its proper limit. To do this, I provide means for automatically setting the shaft $J^\times$ to its true position—i. e., should a stave of a slightly-greater length than the normal pass under the cross-head $F^5$ the wheel $J^6$ will be turned a trifle more than one-half, and, again, should the stave be slightly shorter than normal the wheel will not make a complete half-revolution. Such means I provide for always setting the shaft back or forward to its half-revolution position; and to this end I secure upon said shaft $J^\times$ the disks $O^5$, having parallel flat faces $o^5$ $o^5$, and the opposite curved faces $o^6$ $o^6$, arranged concentric with the shaft, leaf-springs $P^5$, secured upon brackets $p^5$, secured to the main frame, being arranged to press upon the disks, as shown. The cranks $j^5$ and the disks $O^5$ are arranged, respectively, so that when the cranks have pushed or pulled the formers to their full extent one of the flat faces $o^5$ will be uppermost and engaged by the springs $P^5$, which bear upon them in such a manner that should the wheel $J^6$ be turned a little more than a half-revolution they (the springs $P^5$) pull the wheel backward until they rest centrally on the flat faces, as stated. Now should the movement of the wheel $J^6$ fall short of a complete half-revolution the pressure of the springs $P^5$ upon the corners of $o^5$ will cause the shaft to make a further movement forward until the flat faces $o^5$ come centrally under the bearing-faces of the springs. After the stave has been cut and bilged, as stated, it passes on and is discharged at the end of the machine, or it can, if desired, be fed to the planing devices in a manner substantially as shown in my other patent referred to.

From the foregoing description, taken in connection with the drawings, the complete operation and the advantages of my invention will be readily understood by those skilled in the art of stave-making.

It will be observed that all of the machine operates automatically after the stave is fed to the trimmer-saws, the several parts serving to give the proper bilge and bevel to all staves irrespective of their thickness, length, or width.

Having thus described my invention, what I claim, and desire to secure by Letters Patent, is—

1. In a stave trimming and jointing machine, the combination, with the main frame, the stave-carrier operating to carry the stave longitudinally through the machine, and means for operating such carrier, of a transverse shaft I, journaled above the carrier, trimmer-arms F, laterally adjustable thereon, the said shaft I formed with right and left threads, the boxes H, the gage-arms E, connected therewith and to the saw-arbors, their front ends projected forward of the front end of the machine, the gears $i$ on the shaft I, and the geared disks J, engaging said gears $i$ and formed with operating-handles, whereby said disk J is moved in either direction to turn the shaft I in reverse directions to set the saws, as and for the purposes described.

2. In a stave trimming and jointing machine, the combination, with the main frame, main drive-shaft mounted thereon, a stave-carrier arranged to carry the stave longitudinally through the machine, and adjustable cutters journaled at right angles to the said carrier and adapted to cut the bevel of the stave, the shafts of said cutters provided with belt-pulleys $c^7$, of the shaft G, journaled transversely over the stave-carrier and in advance of the cutters, trimmer-saws mounted on said shaft to turn therewith, and said shaft provided with belt-pulleys Q and $g^6$, the belt connections between said pulleys $g^6$ and the pulleys $c^7$, and belt connections between the pulleys Q and the main drive-shaft, substantially as and for the purpose described.

3. The combination, with the main frame formed with a longitudinal bed-rail B, an endless carrier traveling in said rail, and means for operating such carrier, of the transversely-movable cutters $B^5$, mounted to each side of the carrier, the supporting-frames of said cutters mounted upon rock-shafts journaled parallel to the carrier, counter-weights secured to said shafts for normally holding the cutter-frames to their innermost positions, stops secured to said frames, adapted to engage the main-frame beams $a^5$ for limiting such inward movement, said cutter-frames adapted to be adjustably set in relation to the passing stave, and means for holding them in adjusted positions and operating them, substantially as and for the purposes described.

4. In a stave-jointing machine, the combination, with the main frame and the longitudinal stave-carrier, of laterally-movable cutter-frames, a vertically-movable cross-head arranged to be lifted by the passing stave, the movable head-blocks $D^5$, the plunger-rods $D^6$, connecting such blocks with the cutter-frames, cams for holding the plunger-rods $D^6$ to their adjusted positions during the cutting of the stave, and the cam-operating devices, consisting of the rods $d^{10}$, connected with the cross-head, the weighted levers $d^9$, and the link-arms $d^7$, connected with the said cams, all arranged substantially as shown, and for the purpose described.

5. In a stave-jointing machine, the combination, with the main frame, the longitudinal stave-carrier, and means for operating it, of the laterally-movable swinging cutter-frames $C^5$ $C^5$, supported on weighted rock-shafts $C^6$ and provided with lateral extensions $C^{13}$, the head-blocks $D^5$, the plunger-rods $D^6$, pivoted to the frames $C^5$ and operating in the head-blocks $D^5$, the cross-head $F^5$, arranged to be operated by the moving billet, and locking devices carried and operated by the movement of the cross-head $F^5$, the bilge-formers $G^7$, arranged to reciprocate in guideways on the frame, the swinging lever-arms $I^5$, connected to the head-blocks $D^5$ and pivoted at their rear ends to the frame A, their forward ends adapted to be moved inward and outward by the formers $G^7$, and devices intermediate the rock-shafts and the front ends of said levers $I^5$, whereby said levers are automatically set to a starting position to be operated by the formers $G^7$, said devices operated by the rocking of the shafts $C^6$ of the frames $C^5$, said frames arranged to be spread apart by the passing stave, substantially as and for the purpose described.

6. In a stave-jointing machine, the combination, with the main frame and the longitudinally-movable stave-carrier, of the transversely-movable cutter-carrying frames $C^5$, connected at their lower ends to rock-shafts $C^6$, the spreaders $A^5$, pivoted to the main frame and connected to the frame $C^5$, as shown, the vertically-movable cross-head $F^5$, arranged to be lifted by the passing stave, the head-blocks $D^5$, the plunger-rods connected to the cutter-frames and operating in the head-blocks, the cams $E^5$ for holding said rods to their adjusted positions during the cutting of the stave, and devices connected to the cross-heads, and the cams $E^5$ for locking such cams when the cross-heads are elevated, said devices adapted to retain a semi-rigid condition when ordinary strain is applied to the cam and to become a link connection when too great a lift is imparted to the cross-head by a stave of more than ordinary thickness, all arranged substantially as and for the purpose described.

7. In a stave-jointing machine, essentially as described, the combination of stave-carrying devices mounted in the main frame, the cross-head $F^5$, operated by the passing stave, the transversely-adjustable cutter-frames $C^5$, and cutters $B^5$, having rocking bearings at their lower ends, said frames $C^5$ adapted to be spread by the moving stave, the cross-heads $D^5$, the plunger-rods operating therein, the cam-lever $E^5$, the weighted lever $d^9$, the link $d^7$, connecting said lever and the cam-lever, the rods $d^{10}$, having a pivotal connection with the weighted lever and formed with downward and outward extensions $d^{12}$, and the adjusting-screws $d^{13}$, adapted to engage said extensions $d^{12}$, said rods $d^{10}$ connected to and operated by the cross-heads $F^5$, substantially as and for the purpose described.

8. In a stave-jointing machine, the combination, with the main frame, the stave-carrying devices arranged as shown, the transversely-movable cutters mounted in frames carrying rock-shafts $C^6$ at their lower ends journaled in the main frame, the plunger-rods connected to such frames, the transversely-movable head-blocks $D^5$, and means for holding the pistons to the head-blocks when the cutters are spread apart, of the horizontally-swinging levers $I^5$, pivoted at their rear ends to the frame, connected to the head-blocks at a point near their front ends, and connections between the front ends of said levers and the rock-shafts $C^6$, whereby the rocking movement of such shafts will adjust said levers, head-blocks, and cutters relatively to the width of the stave, substantially as and for the purpose described.

9. In a stave-jointing machine, essentially as described, the combination, with the stave-carrying devices, the rock-shafts $C^6$, journaled parallel to said devices, the frames $C^5$, supported thereon, the cutters journaled therein transversely to the stave-carrier, said cutter-frames $C^5$ arranged to be spread by the passing stave, means for holding them locked to their adjusted positions, the head-blocks $D^5$, and the plunger-rods $D^6$, connecting such blocks with swinging frames $C^5$, of the levers $I^5$, the reciprocating formers $G^7$, the diagonally-disposed swinging plates $H^5$, arranged to swing out by the movement of the formers $G^7$, the arms $C^{12}$, projected from the shafts $C^6$, the wedge-plates $J^5$, connected with the free ends of said arms $C^{12}$ and arranged to be moved vertically between the diagonal plates $H^5$ and the free ends of the levers $I^5$, whereby as the shafts $C^6$ are rocked outward the plates $J^5$ will be drawn down to adjust the levers $I^5$ outward, and means for operating the formers $G^7$, all arranged substantially as and for the purpose described.

10. In a stave-jointing machine, essentially as described, the combination of the longitudinal stave-carrying devices and the transversely-movable cutters journaled in frames supported upon rock-shafts journaled in the main frame, the head-blocks connected with such frames and the levers $I^5$, pivoted at one end to the main frame and connected with the head-blocks of the drive-shaft M, provided with a fixed gear $m^4$, a second shaft $J^\times$, provided with a loose gear, and clutch mechanism connected therewith, and cranks $j^5$, the reciprocating formers $G^7$, arranged when moved to engage the levers $I^5$ and swing them outward, pitman-arms connecting said formers with the cranks on the shaft $J^\times$, the cross-heads $F^5$, and shifting devices connecting the clutch mechanism with the cross-head, whereby said mechanism is thrown into engagement when the cross-head is lifted and released when the cross-heads fall, as and for the purposes described.

11. The combination, with the stave-carrier devices, the transversely-movable cutters, the head-blocks $D^5$, connected therewith, and the rock-shafts $C^6$, forming the pivotal supports for the cutter-supporting frames, of the swinging lever-arms $I^5$, the reciprocating former-plates $G^7$, the supporting-guides $G^5$, the swinging outwardly-inclined plates $H^5$, the weighted connections between the front ends of the levers $I^5$ and the guides $G^5$, the vertically-movable wedge-plates $J^5$, operating between the ends of the levers $I^5$ and the plates $H^5$, said weighted connections serving to automatically hold the ends of the levers $I^5$ against the plates $J^5$, and means for reciprocating the formers $G^7$, substantially as and for the purposes described.

12. The combination, with the stave-carrying devices, the cross-head $F^5$, the transversely-movable cutters $B^5$, the rock-frames $C^5$, supporting such cutters, the head-blocks $D^5$, connected therewith, and the swinging levers $I^5$, pivoted at one end to the main frame and near their front ends to the head-blocks, of the drive-shaft M, provided with a fixed gear $m^4$, the shaft $J^\times$, carrying a loose gear $J^6$, meshing with the gear $m^4$ and with disks $o^5$, having alternately-curved and flat faces $o^5$ $o^5$ $o^6$ $o^6$, leaf-springs $P^5$, arranged to normally engage the flat faces $o^6$ when the shaft $J^\times$ is at rest, clutch mechanism connected to said gear $J^6$, shifting devices connected with said clutch mechanism and cross-head $F^5$ and operated to set and release the clutches by the rise and fall of the said cross-head, cranks $j^5$, formed on the shafts, the formers $G^7$, held to reciprocate in guides on the main frame and to engage the front ends of the levers $I^5$, and the pitman connections between such formers and the shaft $J^7$, said formers, shaft $J^5$, and gear mechanism and the disks O arranged relatively so that said shaft will be intermittently revolved a half-revolution during the passage of each stave and held to such movement by the springs $P^5$ engaging the flat faces of the disks $O^5$, all arranged substantially as and for the purpose stated.

WM. J. WRIGHT.

Witnesses:
SOLON C. KEMON,
FRED G. DIETERICH.